(12) United States Patent
Park et al.

(10) Patent No.: US 12,380,788 B2
(45) Date of Patent: Aug. 5, 2025

(54) SYSTEM FOR AND METHOD OF SAFETY MANAGEMENT BASED ON CASCADE DEEP LEARNING NETWORK

(71) Applicant: HYUNDAI MOBIS CO., LTD., Seoul (KR)

(72) Inventors: Joon Hyung Park, Yongin-si (KR); Hye Rin Kim, Yongin-si (KR); Yeong Seok Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 34 days.

(21) Appl. No.: 18/226,393

(22) Filed: Jul. 26, 2023

(65) Prior Publication Data
US 2024/0087439 A1 Mar. 14, 2024

(30) Foreign Application Priority Data
Sep. 13, 2022 (KR) .................. 10-2022-0114939

(51) Int. Cl.
*G08B 21/02* (2006.01)
*G06V 10/82* (2022.01)
*G06V 20/52* (2022.01)
*G06V 40/10* (2022.01)
*G06V 40/20* (2022.01)
*H04L 65/65* (2022.01)

(52) U.S. Cl.
CPC ............. *G08B 21/02* (2013.01); *G06V 10/82* (2022.01); *G06V 20/52* (2022.01); *G06V 40/10* (2022.01); *G06V 40/20* (2022.01); *H04L 65/65* (2022.05)

(58) Field of Classification Search
CPC ........ G06V 10/82; G06V 20/52; G06V 40/10; G06V 40/103; G06V 40/20; G06V 40/23; G08B 13/196; G08B 17/125; G08B 21/02; G08B 21/18; G08B 25/00; G08B 29/186; H04L 65/65
See application file for complete search history.

(56) References Cited

U.S. PATENT DOCUMENTS

| | | | |
|---|---|---|---|
| 11,165,954 B1 * | 11/2021 | Beach | H04N 23/65 |
| 2020/0327465 A1 * | 10/2020 | Baek | G16H 50/20 |
| 2022/0033077 A1 * | 2/2022 | Myslinski | G05D 1/102 |

FOREIGN PATENT DOCUMENTS

KR 10-2022-0077404 A 6/2022

* cited by examiner

*Primary Examiner* — Omer S Khan
(74) *Attorney, Agent, or Firm* — Morgan, Lewis & Bockius LLP (57) ABSTRACT

The present disclosure relates to a system for safety management based on a cascade deep learning network, and the system for safety management based on the cascade deep learning network includes a camera module that captures image of an area to be monitored at an industrial site; and a processor that receives and analyzes image data captured by the camera module in real time.

15 Claims, 4 Drawing Sheets

SYSTEM FOR AND METHOD OF SAFETY MANAGEMENT BASED ON CASCADE DEEP LEARNING NETWORK

CROSS-REFERENCE TO RELATED APPLICATION

This application claims priority from and the benefit of Korean Patent Application No. 10-2022-0114939, filed on Sep. 13, 2022, which is hereby incorporated by reference for all purposes as if set forth herein.

BACKGROUND

Field

Exemplary embodiments of the present disclosure relate to a system for and a method of safety management based on a cascade deep learning network, and more particularly, to a system for and a method of safety management based on the cascade deep learning network being capable of performing a safety management of an industrial site through an analysis of real-time image data based on the deep learning.

Discussion of the Background

In conventional industrial sites, a safety management system requires an installation of various sensors to detect worker entry or fire in a specific area.

For example, the sensors are representative of an area sensor for detecting a specific area and a temperature sensor for detecting rapid temperature changes caused by a fire, or the like. And a conventional safety management system requires an additional sensor suitable for each required function.

However, when the sensors are impossible to install due to the specificity of the site, it is difficult to apply the sensors to the safety management system.

For example, when a robot tries to detect an intrusion (entry) of a worker into a moving area, an application of the area sensor may be difficult due to a movement of the robot. In addition, installation and periodic management of the sensors are expensive, and there is a problem that these costs increase as functions are added.

Accordingly, in terms of flexibility for applying new features to industrial sites (for example: easily adding new monitoring functions in software without addition of hardware sensors), and cost for installation and maintenance, there is a need for a technology that allows industrial safety management to be performed only by analyzing image data acquired by a camera without need to install sensors.

The related art of the present disclosure is disclosed in Korean Patent Application Publication No. 10-2022-0077404 (published on Jun. 9, 2022 and entitled "SYSTEM FOR AND METHOD OF MULTI-LEVEL WORKPLACE SAFETY CONTROL FOR WORKER SAFETY").

SUMMARY

According to an aspect of the disclosure, the present disclosure has been made to solve the above mentioned problems, and an object is to provide a system for and a method of safety management based on a cascade deep learning network being capable of performing the safety management at an industrial site through an analysis of real-time image data based on the deep learning.

The system for safety management based on the cascade deep learning network according to an aspect of the present disclosure includes: a camera module configured to capture images of areas to be monitored at the industrial site; and a processor configured to receive and analyze image data captured from the camera module in real time, and perform a response action in accordance with a situation of the industrial site analyzed.

In an embodiment of the present disclosure, the processor may perform learning in advance to analyze the image data based on a cascade deep learning.

In an embodiment of the present disclosure, the system may further include a database that stores at least one of the image data, an object recognition model, a posture estimation model of a worker, a motion classification model of the worker, a response alarm or response action data by accident, and a response alarm or response action data for each detection movement, wherein the processor may analyze the image data with reference to information stored in the database.

In an embodiment of the present disclosure, the processor may output the response alarm or the response action order to a target device based on analysis results of the image data.

In an embodiment of the present disclosure, the system may further include an alarm module that outputs an accident occurrence or a response alarm for each detection movement according to a control of the processor.

In an embodiment of the present disclosure, the camera module may input a video, which is real-time image data, to the processor by frame in a real time streaming protocol (RTSP) method.

In an embodiment of the present disclosure, the processor may apply the object recognition model to the image data, may detect the worker or designated accident occurrence, and may output the response alarm, wherein the designated accident may include at least one of fire, flash, and smoke.

In an embodiment of the present disclosure, when workers are recognized by the object recognition model, the processor may apply the posture estimation model to the recognized workers to calculate a major body portion or joint position corresponding to each workers' posture.

In an embodiment of the present disclosure, when an intrusion of the worker is detected into an area where a facility or robot is operating based on the results of a posture estimation, the processor may stop a motion of the operating facility or robot to prevent an occurrence of a safety accident.

In an embodiment of the present disclosure, the processor may estimate the motion of the workers by applying the motion classification model to the recognized workers, as a result of estimating the motion of the workers, when a dangerous motion of the workers is detected, may output the response alarm through the alarm module, and may classify the motion into a number of major movements common to each industrial site, and may detect the lying down and falling down movements as the dangerous motion among the plurality of major movements.

A method of safety management based on a cascade deep learning network according to another aspect of the present disclosure includes: inputting, captured images of areas to be monitored at an industrial site through a camera module, to a processor; and receiving and analyzing, by the processor, the image data captured by the camera module in real time, and performing response actions in accordance with a situation at the industrial site analyzed.

In an embodiment of the present disclosure, the method may further include: storing at least one of the image data, an object recognition model, a posture estimation model of the worker, a motion classification model of the worker, a response alarm or response action data by accident, and a response alarm or response action data for each detection movement through a database, wherein the processor may perform analysis of the image data with reference to information stored in the database.

In an embodiment of the present disclosure, in the performing of the response action that are appropriate for the situation at the industrial site analyzed, wherein the processor may output the response alarm or a response action order to a target device based on the analysis results of the image data.

In an embodiment of the present disclosure, in the inputting of the image to the processor after capturing the image, wherein the camera module may input a video, which is real-time image data, to the processor by frame in a real time streaming protocol (RTSP) method.

In an embodiment of the present disclosure, in the performing of the response action that are appropriate for the situation at the industrial site analyzed, wherein the processor may apply the object recognition model to the image data, may detect worker or designated accident occurrence, and may output the response alarm, and the designated accident may include at least one of fire, flash, and smoke.

In an embodiment of the present disclosure, in the performing of the response action that are appropriate for the situation at the industrial site analyzed, when the workers are recognized by the object recognition model, the processor may apply a posture estimation model to the recognized workers to calculate major body portions or joint positions corresponding to each workers' posture.

In an embodiment of the present disclosure, in the performing of the response action that are appropriate for the situation at the industrial site analyzed, wherein, when an intrusion of the worker is detected into the area where a facility or a robot is operating based on the results of the posture estimation, the processor may stop an operation of the operating facility or robot to prevent an occurrence of a safety accident.

In an embodiment of the present disclosure, in the performing of the response action that are appropriate for the situation at the industrial site analyzed, wherein the processor may estimate the motion of the workers by applying the motion classification model to the recognized workers, as the result of estimating the motion of the workers when the dangerous motion of the workers is detected, may output the response alarm through an alarm module, and may classify the motion into a number of major movements common to each industrial site, and may detect the lying down and falling down movements as dangerous movements among the plurality of major movements.

According to an aspect of the present disclosure, the present disclosure capable of performing safety management in industrial sites through analysis of real-time image data based on a deep learning.

DETAILED DESCRIPTION OF THE ILLUSTRATED EMBODIMENTS

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an embodiment of a system for safety management based on a cascade deep learning network and a method thereof according to the present disclosure will be described with reference to the accompanying drawings.

For clarity and convenience in description, thicknesses of lines, sizes of constituent elements, and the like may be illustrated in an exaggerated manner in the drawings. In addition terms described below are defined by considering functions according to the present disclosure and may vary according to the intention of a user or a manager or according to the common practices in the art. Therefore, definitions of these terms should be defined in light of details disclosed throughout the present specification.

Figure 1:
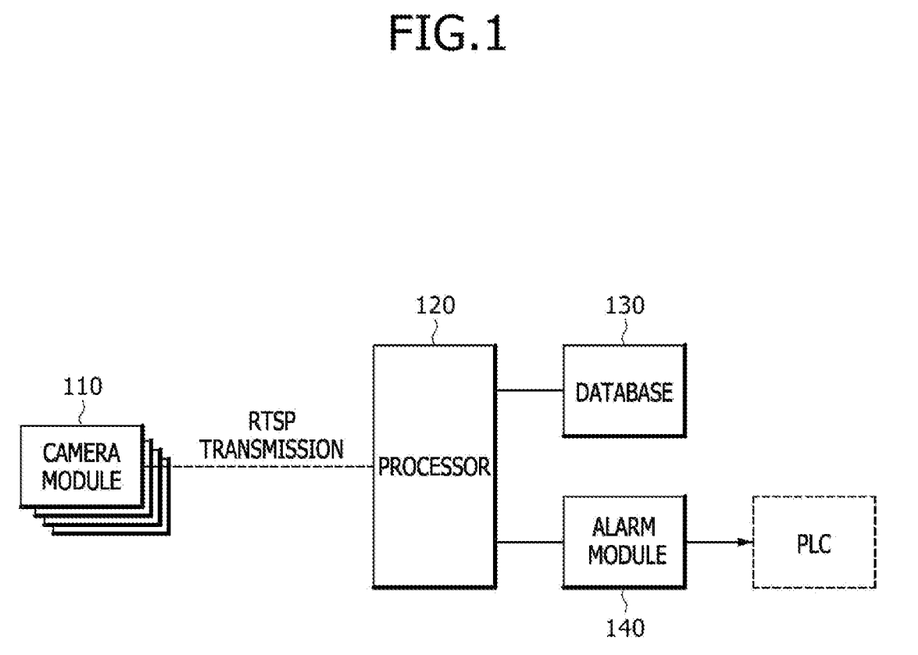
FIG. 1 is an exemplary view illustrating a schematic configuration of a system for safety management based on a cascade deep learning network according to an embodiment of the present disclosure.

FIG. 1 is an exemplary view illustrating a schematic configuration of a system for safety management based on a cascade deep learning network according to an embodiment of the present disclosure.

As illustrated in FIG. 1, the system for safety management based on the cascade deep learning network according to the embodiment includes a camera module 110, a processor 120, a database 130, and/or an alarm module 140.

The camera module 110 captures an image of an area to be monitored. In some implementations, the camera module 110 is referred to as, but is not limited to, a camera (e.g., a still camera, digital camera, video camera, camera phone, etc.) or any other imaging equipment.

A plurality of camera modules 110 may be installed at an industrial site.

The processor 120 receives and analyzes an image data captured by the camera module 110 in real time.

The processor 120 performs learning to analyze the image data based on the cascade deep learning.

The database 130 stores at least one of the image data, an object recognition model, a posture estimation model of a worker, a motion classification of the worker, a response alarm or response action data by accident (for example: fire, flash, smoke, etc.), and the response alarm or response action data for each detection movement.

In this case, the database 130 may be replaced with an internal memory (not illustrated) of the processor 120.

The processor 120 may perform to analyze the image data with reference to information stored in the database 130, and may output the response alarm and/or a response action order to a target device (for example: facility, robot, etc.) based on analysis results of the image data.

According to a control of the processor 120, the alarm module 140 outputs an accident occurrence or a response alarm for each detection movement (for example: a visual alarm, an audible alarm, a tactile alarm). In addition, a signal output from the alarm module 140 (for example: accident occurrence or response alarm for each detection movement) may be transmitted to a designated device (for example: PLC (Programmable Logic Controller)) to stop a designated facility or robot. The alarm module 140 can be implemented as, but not limited to, a speaker, a set of lights, a display, or any other alarm equipment.

Hereinafter, an operation of the system for safety management based on the cascade deep learning according to the present embodiment will be described with reference to a flowchart of FIG. 2.

Figure 2:
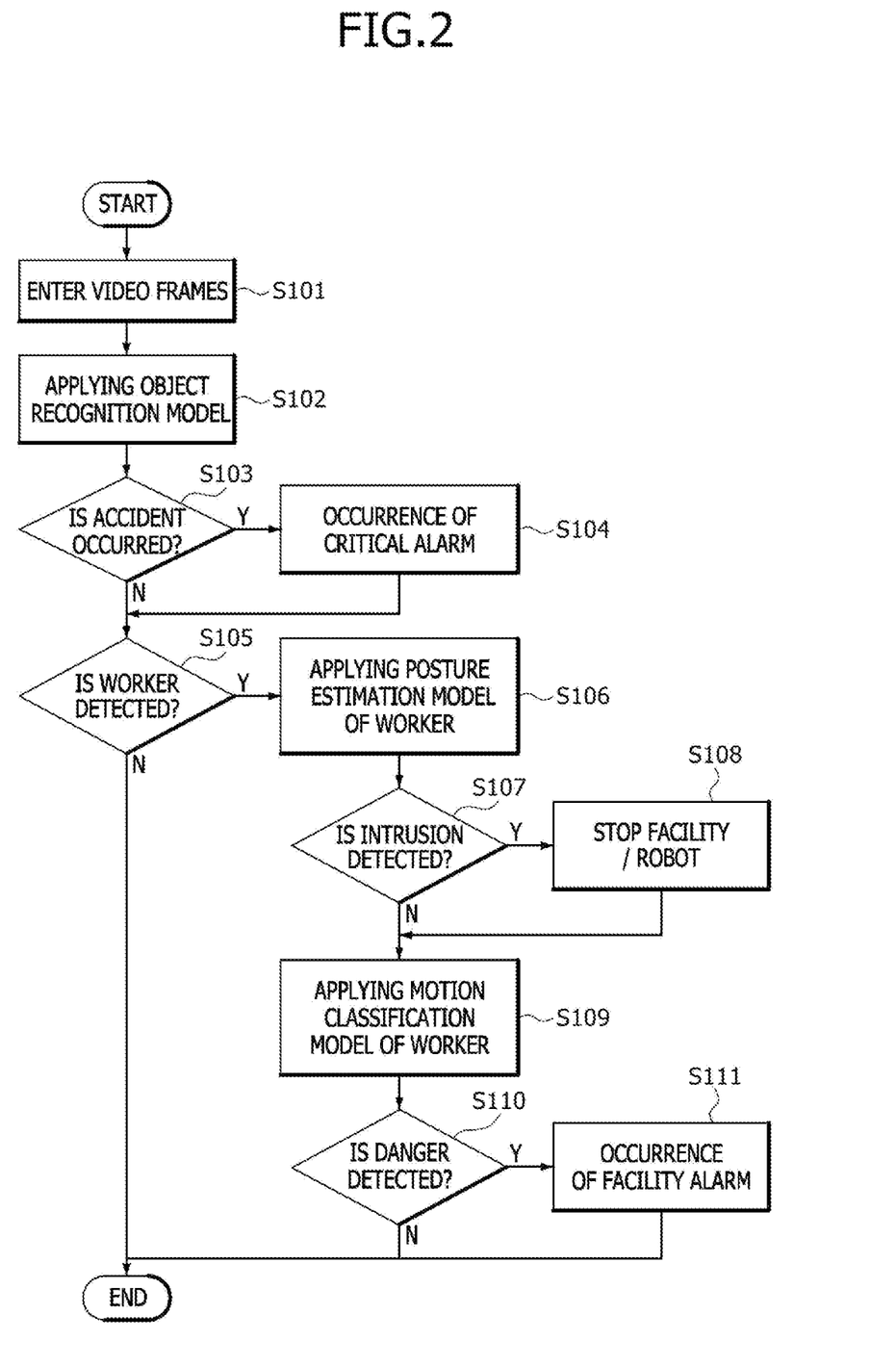
FIG. 2 is a flowchart illustrating a method of safety management based on a cascade deep learning network according to an embodiment of the present disclosure.

FIG. 2 is a flowchart illustrating a method of safety management based on a cascade deep learning network according to an embodiment of the present disclosure.

Referring to FIG. 2, the processor 120 receives the image data (for example: video) in real time in a real time streaming protocol (RTSP) method from the camera module 110 (for example: IP camera) (S101).

For example, the processor 120 receives a real-time input of a video by frame in the RTSP method from the camera module 110.

For reference, the most important factor in real-time safety management is that when an incident occurs, it should be able to recognize the incident quickly and take immediate action. Accordingly, a deep learning algorithm applied in the present embodiment satisfies two criteria such as high accuracy and short execution time (inference time). In addition, in order to ensure that a video frame transmitted through the camera module 110 is continuously transmitted to the processor 120 without delay, a video collected by the camera module 110 is transmitted through the RTSP method through a network. In addition, due to a nature of the system that connects the plurality of cameras for each processor 120, there is an advantage that the camera module 110 can be easily integrated and managed.

In addition, the processor 120 detects workers and/or an occurrence of designated accidents (for example: fire, flash, smoke, etc.) by applying the object recognition model to the image data (that is, video frames) (S102, S103, S105).

Figure 3:
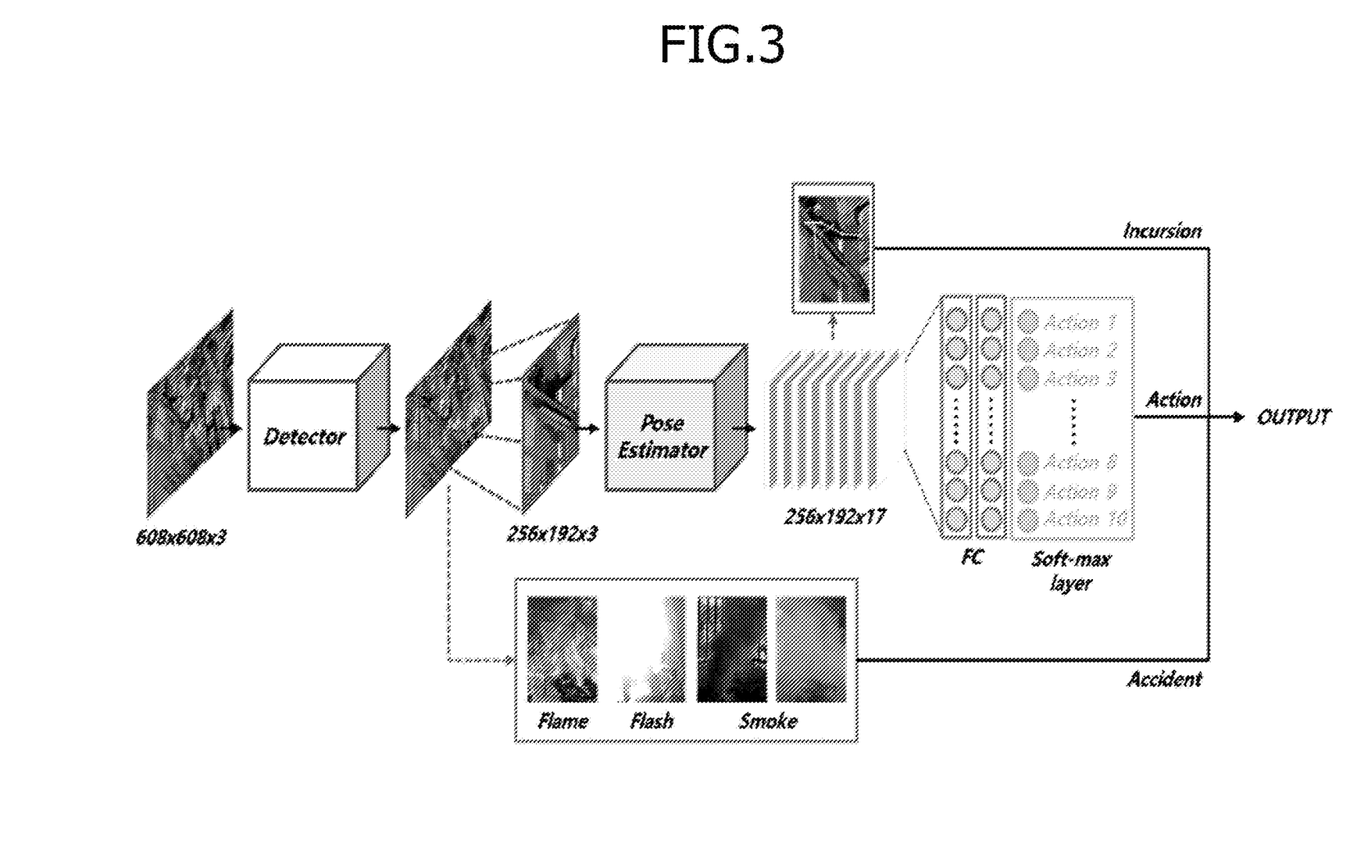
FIG. 3 is an exemplary view illustrated to explain a deep learning algorithm that performs situational judgment by synthesizing results recognized through an object recognition model, a posture estimation model, and a motion classification model in FIG. 2.

For example, referring to FIG. 3, the processor 120 classifies four objects such as person, flame, flash, and smoke from the frame through the object recognition model (that is, a learning model of the object recognition), and designates location as a bounding box. At this time, the present embodiment selects and applies a You Only Look Once (YOLOv5) model that satisfies two criteria: such as high accuracy and short performance time (inference time). The YOLOv5 model may secure performance of more than 99% through optimization despite a very fast execution time. Even when a video frame size is different, the video frame is resized to 608×608 for consistency processing. In a model learning stage, augmentation allows learning to be performed on some size and ratio differences, thereby resulting in little performance degradation.

When at least one of the designated accidents (for example: fire, flash, smoke, etc.) is detected, the response alarm is output through the alarm module 140 (S104).

In addition, when workers are recognized through the object recognition model, the processor 120 applies a posture estimation (that is, a posture estimation deep learning model) to the recognized workers and calculates major body portions or joint positions (for example: 17ea) corresponding to each worker's posture (S106).

For example, the posture estimation model performed on the recognized workers is a key function that enables detailed inspection and prediction of worker's motion whether the worker intrudes (enters) into a prohibited area, major body portions or joint positions (Nose, L-Eye, R-Eye, L-Ear, R-Ear, L-Shoulder, R-Shoulder, L-Elbow, R-Elbow, L-Wrist, R-Wrist, L-Hip, R-Hip, L-Knee, R-knee, L-Ankle, R-Ankle) of the plurality of workers (for example: 17ea) are estimated through the posture estimation. At this time, accurate coordinate estimation for each body portions or joint positions can detect the worker's intrusion into the area in more detail, and also enable recognition of a specific portion. In the present embodiment, the posture estimation model is a deep high resolution network (HRNET) and includes a model that has achieved a state of the art (SOTA) in the field of Human Pose Estimation. Referring to FIG. 3, the bounding box recognized by each worker is cropped, resized to a size of 256×192, and then the posture estimation model is applied to ensure high accuracy and fast performance time.

In addition, when the worker's intrusion (entry) into the prohibited area (for example: an area where a facility or a robot is moving) is detected (YES in S107), the processor 120 stops the operation of a facility or robot operating in the corresponding area to prevent the occurrence of a safety accident, based on the results of the posture estimation (S108).

For example, the plurality of major body portions or joint positions calculated for each worker (for example: 17ea) not only enable precise intrusion detection compared to the existing method, using this, but also is possible to classify what the current motion of the worker is.

For reference, the present embodiment is a motion classification model that analyzes a motion of each worker using fully connected layers (FCL), and classifies into the plurality of (for example: 10ea) major movements common to each industrial site (for example: standing up, sitting down, walking, running, jumping, lying down, bending/picking, carrying loads, arriving, and falling down). Among the movements, the lying down and falling down are classified as dangerous movement when the worker collapses.

In addition, the processor 120 estimates the motion of the workers by applying the motion classification model to the recognized workers (for example: by applying the FCL model to the workers' major body portions or joint positions) (S109).

Figure 4:
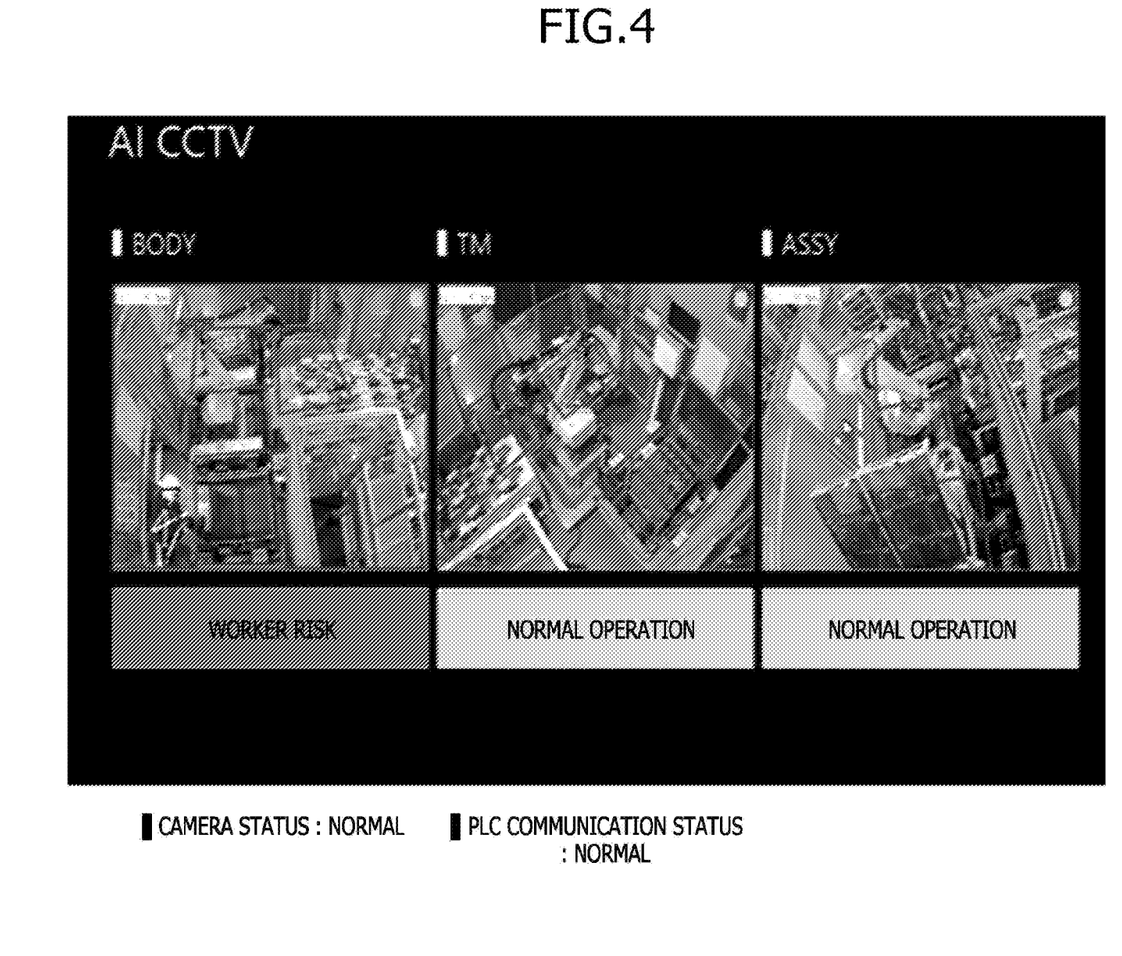
FIG. 4 is an exemplary view illustrating a method of outputting a response alarm according to a situation when a dangerous motion is detected by estimating motion of workers in FIG. 2.

As a result of estimating the motion of the workers, when the workers' dangerous motion (dangerous behavior) is detected (YES in S110), a response alarm suitable for the situation is output through the alarm module 140 (S111) (refer to FIG. 4).

As described above, the present embodiment synthesizes results recognized through three deep learning algorithms (for example: object recognition model, posture estimation model, motion classification model), and makes sure to respond according to each situation. For example, the workers and manager are informed with the recognized situation in such a manner as to perform quick response action.

At this time, the judging criteria and response action for each dangerous situation are organized according to the industrial site, and especially include three response actions such as a facility alarm (for example: output an alarm from a facility to which workers' dangerous motion can be applied), a robot and/or facility stop (for example: robot and/or facility stop when failure to stop a worker from entering), and occurrence of a critical alarm. Herein, facility alarms and robot stop operations correspond to regional countermeasures corresponding to the area where each situation occurred, and critical alarm operations correspond to global countermeasures against the entire factory, such as fires.

As described above, the present embodiment receives the image data (for example: video) collected through the camera module 110 in real time, object detection is performed on the received image data (for example: video) to detect (recognize) predesignated objects (for example: worker, fire, flash, smoke, etc.), for the detected (recognized) workers, the main body portions or joint positions of the workers (for example: 17ea) are calculated through the posture estimation, the workers' motion is detected (recognized) through the calculated major body portions or joint positions, and the detected (recognized) results are comprehensively determined, and then response actions (for example: alarms, robot stop, etc.) are performed according to the situation at the industrial site.

As described above, the present embodiment detects a worker entering a dangerous area or a fire through an analysis of the image data, and has the effect of allowing appropriate response actions according to the situation of the industrial site determined through analysis of the image data without need to install sensors.

In addition, the present embodiment can reduce the number of sensors that must be installed and/or maintained to ensure safety at the industrial site, unlike sensors that have limited recognition with simple functions, more accurate and detailed safety diagnosis is possible, and even in areas where sensors cannot be installed due to a specificity of the industrial site, it has an effect of allowing safety management to be performed using a camera.

Although exemplary embodiments of the disclosure have been described for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A system for safety management based on a cascade deep learning network, the system comprising:
    a camera configured to capture images of areas to be monitored at an industrial site; and
    a processor configured to receive and analyze image data captured from the camera in real time by:
    applying an object recognition model to the image data to determine whether an accident occurs, in response to determination that the accident occurs, generating a response alarm,
    in response to determination that the accident does not occur, determining whether a worker is detected in the image data,
    in response to determination that the worker is detected in the image data, determining whether an intrusion of the worker is detected by calculating a major body portion or joint position corresponding to posture of the worker using a posture estimation model;
    in response to determination that the intrusion of the worker is detected, stopping an operation of a facility or a robot;
    in response to determination that the intrusion of the worker is not detected, estimating a motion of the worker recognized in the image data by applying a motion classification model to the worker detected by the object recognition model in the image data, as a result of estimating the motion of the worker, and outputs the response alarm through an alarm module in response to detection of a dangerous motion of the workers, and
    classifying the motion into a number of major movements common to each industrial site, and detects lying down and falling down movements as the dangerous motion among the plurality of major movements.

2. The system of claim 1, wherein the processor performs learning in advance to analyze the image data based on a cascade deep learning.

3. The system of claim 1, further comprising:
    a database configured to store at least one of the image data, the object recognition model, the posture estimation model of the worker, a motion classification model of the worker, the response alarm or response action data by accident, and a response alarm or response action data for each detection movement,
wherein the processor analyzes the image data with reference to information stored in the database.

4. The system of claim 1, wherein the processor outputs the response alarm or the response action order to a target device based on the analysis results of the image data.

5. The system of claim 1, further comprising:
an alarm module that outputs an accident occurrence or the response alarm for each detection movement according to a control of the processor.

6. The system of claim 1, wherein the camera inputs a video, which is real-time image data, to the processor by frame in a real time streaming protocol (RTSP) method.

7. The system of claim 1, wherein
the accident includes at least one of fire, flash, and smoke.

8. The system of claim 1, wherein,
the posture estimation model is configured to detect the intrusion of the worker into an area where the facility or the robot is operating.

9. A method of safety management based on a cascade deep learning network, the method comprising:
inputting, by a camera, captured images of areas to be monitored at an industrial site, to a processor; and
receiving and analyzing, by the processor, image data captured by the camera in real time by:
applying an object recognition model to the image data to determine whether an accident occurs, in response to determination that the accident occurs, generating a response alarm,
in response to determination that the accident does not occur, determining whether a worker is detected in the image data,
in response to determination that the worker is detected in the image data, determining whether an intrusion of the worker is detected by calculating a major body portion or joint position corresponding to posture of the worker using a posture estimation model, and
in response to determination that the intrusion of the worker is detected, stopping an operation of a facility or a robot;
in response to determination that the intrusion of the worker is not detected, estimating a motion of the worker recognized in the image data by applying a motion classification model to the detected worker, as the result of estimating the motion of the workers in response to detection of a dangerous motion of the workers, outputs the response alarm through an alarm module, and
classifying the motion into a number of major movements common to each industrial site, and detects lying down and falling down movements as the dangerous motion among the plurality of major movements.

10. The method of claim 9, further comprising:
storing at least one of the image data, the object recognition model, the posture estimation model of the worker, a motion classification model of the worker, the response alarm or response action data by accident, and response alarm or response action data for each detection movement through a database,
wherein the processor performs analysis of the image data with reference to information stored in the database.

11. The method of claim 9, wherein in the performing of the response action in accordance with the situation at the industrial site in response to analysis results of the image data,
the processor outputs the response alarm or a response action order to a target device based on the analysis results of the image data.

12. The method of claim 9, wherein, in the inputting the captured image to the processor,
the camera inputs a video, which is real-time image data, to the processor by frame in a real time streaming protocol (RTSP) method.

13. The method of claim 9, wherein
the accident includes at least one of fire, flash, and smoke.

14. The method of claim 9, wherein in the performing of the response action in accordance with the situation at the industrial site in response to analysis results of the image data,
the posture estimation model is configured to detect the intrusion of the worker into an area where the facility or the robot is operating.

15. A system for safety management based on a cascade deep learning network, the system comprising:
a camera configured to capture images of areas to be monitored at an industrial site; and
a processor configured to receive and analyze image data captured from the camera in real time by:
applying an object recognition model to the image data to determine whether an accident occurs, in response to determination that the accident occurs, generating a response alarm,
in response to determination that the accident does not occur, determining whether a worker is detected in the image data; and
in response to determination that the worker is detected in the image data, determining a response action in accordance with a situation of the industrial site, the response action including stopping operation of a facility;
in response to determination that the intrusion of the worker is not detected, estimating a motion of the worker recognized in the image data by applying a motion classification model to the detected worker, as the result of estimating the motion of the workers in response to detection of a dangerous motion of the workers, outputs the response alarm through an alarm module, and
classifying the motion into a number of major movements common to each industrial site, and detects lying down and falling down movements as the dangerous motion among the plurality of major movements.

* * * * *